United States Patent [19]

Teraoka

[11] Patent Number: 4,712,663
[45] Date of Patent: Dec. 15, 1987

[54] VISCOUS COUPLING FOR A DRIVE SHAFT

[75] Inventor: Masao Teraoka, Sano, Japan

[73] Assignee: Tochigifujisangyo Kabushikigaisha, Tochigi, Japan

[21] Appl. No.: 885,219

[22] Filed: Jul. 14, 1986

[30] Foreign Application Priority Data

Jul. 17, 1985 [JP] Japan ............... 60-109277[U]

[51] Int. Cl.⁴ .............................................. F16D 33/00
[52] U.S. Cl. ...................... 192/58 A; 192/110 R; 464/24; 464/162
[58] Field of Search ............. 192/110 R, 58 R, 58 A, 192/58 B, 58 C; 74/650, 730; 180/76, 73.1; 464/162, 24

[56] References Cited

U.S. PATENT DOCUMENTS

| | | |
|---|---|---|
| 1,338,122 | 4/1920 | Carlstedt . |
| 2,229,228 | 1/1941 | Sutter ........................... 192/58 R X |
| 2,259,208 | 10/1941 | Hutchison ........................ 192/58 A |
| 2,337,609 | 12/1943 | Jamieson ....................... 192/58 R X |
| 4,274,516 | 6/1981 | Barley .......................... 192/58 A X |
| 4,548,096 | 10/1985 | Giocastro et al. ............ 192/58 A X |

FOREIGN PATENT DOCUMENTS

| | | |
|---|---|---|
| 1425318 | 11/1968 | Fed. Rep. of Germany . |
| 2109862 | 2/1972 | Fed. Rep. of Germany . |
| 2453563 | 5/1976 | Fed. Rep. of Germany . |
| 3037687 | 5/1982 | Fed. Rep. of Germany . |
| 3148888 | 6/1983 | Fed. Rep. of Germany . |
| 3346061 | 7/1985 | Fed. Rep. of Germany . |
| 1255914 | 12/1971 | United Kingdom . |

Primary Examiner—George H. Krizmanich
Attorney, Agent, or Firm—Thompson, Birch, Gauthier & Samuels

[57] ABSTRACT

A viscous coupling for a drive shaft has an elongated tubular first shaft and an elongated cylindrical second shaft extending into and cooperating with the first shaft to define a cylindrical clearance therebetween. Bearings for accommodating both relative rotation and axial displacement of the first and second shafts are interposed therebetween at opposite ends of the clearance. Seals are associated with the bearings to hermetically seal the ends of the clearance, which is filled with a viscous fluid. The viscous resistance of the fluid to rotation of one shaft relative to the other provides a means of transmitting torque therebetween.

2 Claims, 3 Drawing Figures

VISCOUS COUPLING FOR A DRIVE SHAFT

BACKGROUND OF THE INVENTION

1. Field of the Invention

The present invention relates to a drive shaft apparatus, and, in particular, to an improved drive shaft which is ideal for use as a propeller shaft for a vehicle and the like.

2. Description of the Present Art

In a drive shaft apparatus for a vehicle, such as shown, for example, in Japanese Publication of Unexamined Utility Model Application No. 59-188731, a so-called viscous clutch is interposed in the power transmission system of a four-wheeled drive vehicle with the objective of absorbing undesirable rotational variations and vibration. This viscous clutch comprises a group of resistance plates, which are positioned parallel to and close to the inside of a hermetically sealed chamber and mutually spline-mated in each shaft side member of two shafts which perform torque transmission, and a viscous fluid enclosed between those resistance plates. Then, the relative rotation is restrained by the development of a shearing resistance in the viscous fluid accompanying the relative rotation of the mutual resistance plates, and the torque is distributed. Accordingly, because there is no mutual contact of the members between the two shafts, as is seen in other coupling devices, there is no wear produced, and the differential characteristics are extremely stable and smooth.

However, because a special viscous clutch is used, that portion is heavy, and the costs are increased.

SUMMARY OF THE INVENTION

An object of the present invention is to provide, with due consideration to the drawbacks of such conventional devices, a light-weight and inexpensive drive shaft apparatus having a vibration absorption function without the necessity of installing a special viscous clutch.

In order to accomplish this objective of the present invention, a drive shaft apparatus is provided comprising a tube-shaped first shaft, a second shaft positioned coaxially within the first shaft with a clearance therebetween so that it is capable of rotating relative to the first shaft and a hermetically sealed chamber formed in the clearance space between the first and second shafts, wherein a viscous fluid is enclosed within the hermetically sealed chamber.

BRIEF DESCRIPTION OF THE DRAWINGS

This and other objects, features, and advantages of the present invention will become more apparent from the following description of a preferred embodiment taken in conjunction with the drawings, in which.

DESCRIPTION OF THE PREFERRED EMBODIMENT

Figure 3:
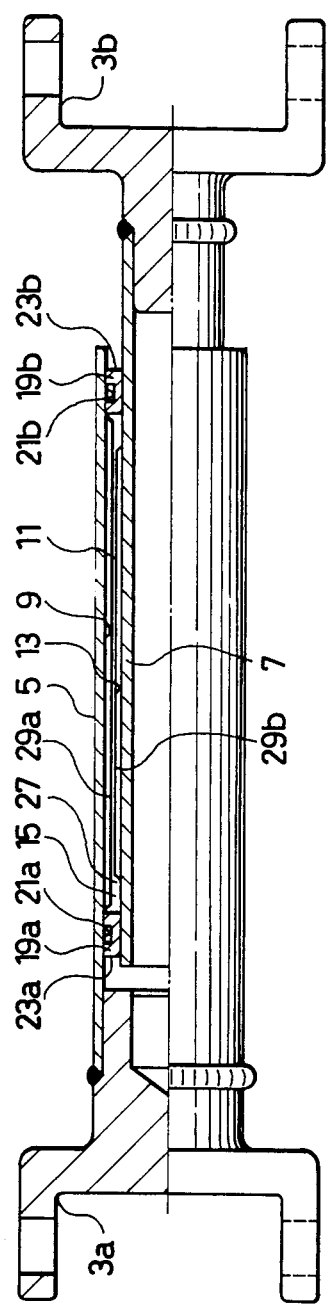
FIG. 3 is a side elevation of another embodiment of the drive shaft apparatus of the present invention, including a cross-sectional drawing of one section.

Now, a preferred embodiment of the present invention will be explained with reference to FIG. 1, FIG. 2, and FIG. 3.

Figure 1:
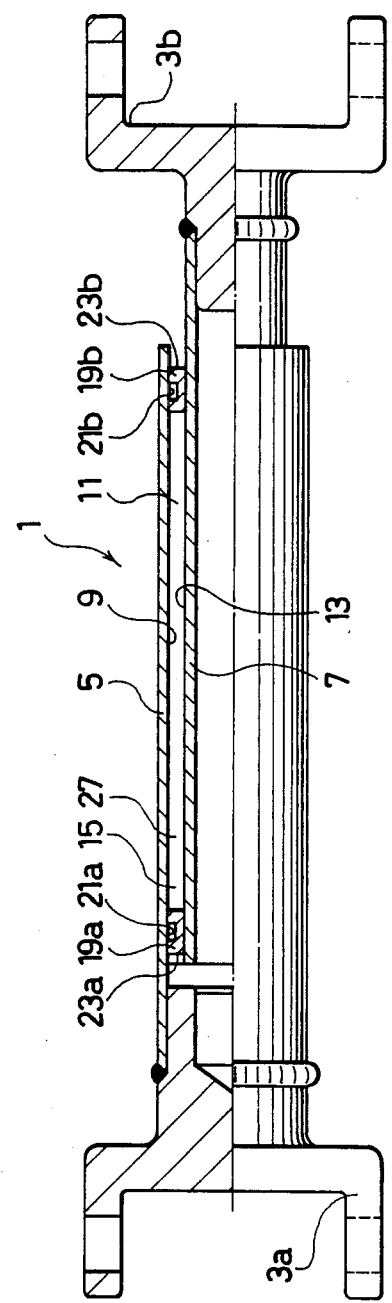
FIG. 1 is a side elevation of one embodiment of the drive shaft apparatus of the present invention, including a cross-sectional drawing of one section.
Figure 2:
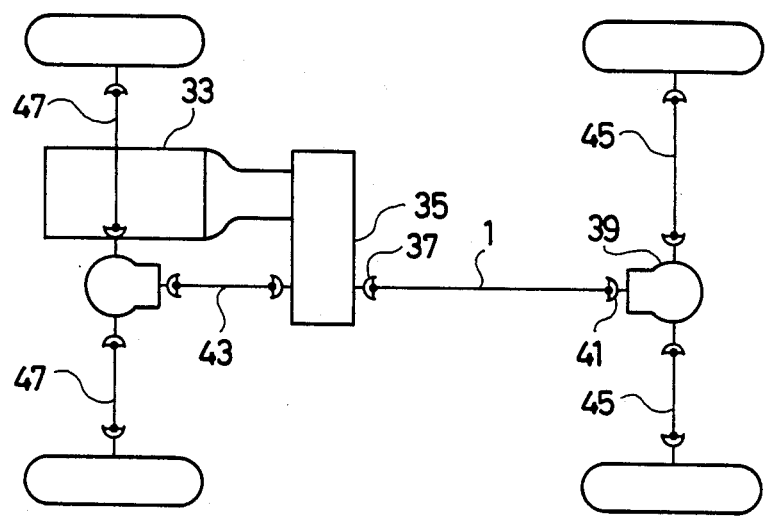
FIG. 2 is a configuration drawing showing the case where the device of FIG. 1 is applied in the power transmission system of a four-wheel drive vehicle.

FIG. 1 is a side elevation drawing, including a cross-sectional drawing of one section of the drive shaft apparatus of the present invention applied as a propeller shaft for a vehicle. A joint section $3a$ and a joint section $3b$ for a universal joint (not shown in the drawings) are formed at the two ends of a propeller shaft 1, and the body of the shaft itself is formed as a hollow double shaft. This hollow double shaft comprises a tubular first shaft 5 which extends from the joint section $3a$ on the left side of the drawing to the right side, and a hollow second shaft 7 which extends from the joint section $3b$ on the right side of the drawing to the left side. The second shaft 7 coaxially inserted into the first shaft 5 maintains a narrow clearance 11 formed between the second shaft 7 and the inner circumferential wall surface 9 of the first shaft 5, and is positioned so that relative rotation is possible. The clearance 11 between the inner circumferential wall surface 9 of the first shaft 5 and the outer circumferential wall surface 13 of the second shaft 7 forms a hermetically-sealed chamber 15. Specifically, a pair of shaft sealing devices $23a$ and $23b$ are mounted close to each of the tubular ends of the first shaft 5 and are assembled from a pair of bearing devices $19a$ and $19b$ and a pair of seal members $21a$ and $21b$, so that the clearance 11 forms the hermetically sealed chamber 15. A viscosity fluid 27 such as a silicon oil is filled into the hermetically sealed chamber 15 through a filler port (not shown in the drawings) which is penetratingly mounted on the tubular section of the first shaft 5. The propeller shaft 1 constructed in this manner is mounted between the universal joints of the transmission side of the undersurface of the chassis of the vehicle and the rear wheel differential device in exactly the same manner as for a conventional device, as shown in FIG. 2.

Next, the operation of the drive shaft apparatus of the present invention constructed in this manner will be outlined.

The output from an engine 33 is taken out from a transfer 35 and is transmitted to the first shaft 5 of the propeller shaft 1 through a universal joint 37, causing the first shaft 5 to rotate. The second shaft 7 of the propeller shaft 1, which is linked to a universal joint 41 coupled to a rear wheel differential devide 39, remains stationary. As a result, the inner circumferential wall surface 9 of the first shaft 5 and the outer circumferential wall surface 13 of the second shaft 7 begin to rotate relative to one another. Then, the shearing force of the viscosity fluid 27 in the clearance 11 is activated, and because of the high velocity fluid a strong shearing resistance is produced in the clearance 11, that is, between the first shaft 5 and the second shaft 7, and torque is transmitted between these two shafts. Specifically, the second shaft continues to rotate in a tagged manner along with the rotation of the first shaft 5. In actual practice, the time delay from the start of the rotation of the first shaft 5 until the start of the drive rotation of the second shaft 7 is extremely short so that rotation occurs almost simultaneously. Afterwards the rotation continues with a minute slip between the shafts 5 and 7, and the transmission of the torque occurs in a status similar to a fluid coupling. Accordingly, at this time, the nonuniform rotation and vibration produced in each of the first shaft 5 and the second shaft 7 is absorbed in an extremely effective manner, so that the torque transmission is very smooth.

In addition, a special differential device is not required to absorb the rotational differences accompanying the differential rotation relative to a front wheel drive shaft 43.

The first shaft 5 and the second shaft 7 of the drive shaft of the present invention are connected through the shaft sealing device 23, as previously explained, so that the drive shaft is freely movable to a certain degree in the axial direction. Specifically, because the length of the drive shaft is variable, it can be applied extremely effectively as a propeller shaft and the like, and a spline connection such as used in conventional propeller shafts is unnecessary. Accordingly, the generation of uncomfortable vibration resulting from use of a spline connection can also be avoided.

Because a large, heavy, and relatively high cost viscous clutch is not used in the drive shaft apparatus of the present invention, the unit is both small and light, and the number of parts is reduced resulting in lower cost. In addition, the surface area contacted by the outside air comprises almost the entire area of the tubular first shaft 5 so that the cooling effect on the viscous fluid 27 is great. Further, because of the fact that there is no abrasion contact section between the first shaft 5 and the second shaft 7, the differential characteristics of the torque transmission are extremely stable in the same way as for a conventional viscous clutch.

Many variations and practical applications are possible in the present invention, which is not limited to the abovementioned embodiment. For example, as shown in FIG. 3, there can be an irregularity such as a spline 29 while the clearance 11 is maintained so that there is no mutual engaging of the inner circumferential wall surface 9 of the first shaft 5 and the outer circumferential wall surface 13 of the second shaft 7. Therefore, the viscous resistance generated in the viscous fluid 27 when the shafts 5 and 7 rotate relative to one another is extremely strengthened, and it is also possible to increase the intensity of the transmitted torque. When the transmitted torque is increased in this manner it is obvious that the drive shaft apparatus can be reduced in size.

In addition, a large number of fins can easily be provided on the external circumference of the first shaft 5 to further increase the cooling of the internal section of the viscous fluid.

In addition, the shape of the clearance 11 between the first shaft 5 and the second shaft 7 positioned coaxially in the internal section of the first shaft 5 can be formed from double, triple, or more cylinders to increase the surface area of this clearance.

The drive shaft apparatus of the present invention also has wide application for shafts other than propeller shafts for use on a vehicle, such as for a pair of drive shafts 45, 47 with the necessary function of absorbing vibration and the like.

Further, because the configuration of the abovementioned embodiment is extremely simple, the enclosed viscous fluid 27 can have an extremely high viscosity, and the transmitted torque can be increased, which is extremely desirable in practical application.

As clearly explained above, in the present invention, a simple coupling device is incorporated with the function of absorbing vibration in the inner section of the drive shaft so that a special viscous clutch or the like is unnecessary.

The overall unit becomes overall extremely compact and light resulting in a very effective and low cost drive shaft apparatus.

What is claimed is:

1. A viscous coupling for a drive shaft, comprising: an elongated tubular first shaft; an elongated cylindrical second shaft extending into and cooperating with said first shaft to define a cylindrical clearance therebetween; bearing means for accommodating both relative rotation and axial displacement of said first and second shafts, said bearing means being interposed between said shafts at the opposite ends of said clearance; sealing means associated with said bearing means for hermetically sealing the opposite ends of said clearance; and, a viscous fluid contained in said clearance, the viscous resistance of said fluid to rotation of one of said shafts relative to the other of said shafts providing a means of transmitting torque therebetween.

2. The viscous coupling of claim 1 wherein radially spaced splines are formed respectively on the inner surface of said first shaft and the outer surface of said second shaft within said clearance.

* * * * *